1

United States Patent
Mekhilef et al.

(10) Patent No.: US 7,514,480 B2
(45) Date of Patent: Apr. 7, 2009

(54) LOW LEVEL RADIATION TREATMENT FOR IMPROVING POLYMER PROPERTIES

(75) Inventors: Nafih Mekhilef, King of Prussia, PA (US); Ramin Amin-Sanayei, Collegeville, PA (US)

(73) Assignee: Arkema Inc., Philadelphia, PA (US)

( * ) Notice: Subject to any disclaimer, the term of this patent is extended or adjusted under 35 U.S.C. 154(b) by 294 days.

(21) Appl. No.: 11/157,225

(22) Filed: Jun. 21, 2005

(65) Prior Publication Data

US 2006/0287409 A1 Dec. 21, 2006

(51) Int. Cl.
  *C08F 2/46* (2006.01)
  *C08J 3/28* (2006.01)
(52) U.S. Cl. .................. 522/156; 522/155; 522/184; 522/185; 522/187; 204/157.15; 204/157.44; 204/157.6; 204/157.63; 204/157.46
(58) Field of Classification Search .................. 522/155, 522/156, 184, 185, 187; 204/157.15, 157.44, 204/157.6, 157.46, 157.63
See application file for complete search history.

(56) References Cited

U.S. PATENT DOCUMENTS

| | | | |
|---|---|---|---|
| 3,864,228 A | | 2/1975 | Rossetti et al. |
| 3,878,164 A | * | 4/1975 | Lott ........................... 522/156 |
| 3,923,621 A | * | 12/1975 | Murayama et al. ........... 525/276 |
| 3,970,770 A | * | 7/1976 | Dhami ........................ 428/379 |
| 4,155,823 A | * | 5/1979 | Gotcher et al. ................. 522/81 |
| 4,188,276 A | * | 2/1980 | Lyons et al. .................. 522/71 |
| 4,808,352 A | * | 2/1989 | Bhateja ....................... 264/435 |
| 4,842,678 A | * | 6/1989 | Noro et al. .................... 216/88 |
| 5,403,524 A | * | 4/1995 | Burger et al. ................ 264/424 |
| 5,426,128 A | * | 6/1995 | Burger et al. ................ 521/134 |
| 5,444,103 A | * | 8/1995 | Tabata et al. .................... 522/5 |
| 5,552,104 A | | 9/1996 | DeNicola et al. |
| 5,916,929 A | * | 6/1999 | Knobel et al. ............... 522/155 |
| 6,184,339 B1 | | 2/2001 | Stansbury et al. |
| 6,310,113 B1 | | 10/2001 | Reichman et al. |
| 6,509,073 B1 | | 1/2003 | Arcella et al. |
| 6,762,215 B2 | * | 7/2004 | Udagawa et al. ............. 522/156 |
| 6,833,414 B2 | | 12/2004 | Granel et al. |
| 7,220,799 B2 | * | 5/2007 | Udagawa et al. ............. 525/199 |
| 2002/0161067 A1 | * | 10/2002 | Udagawa et al. ............. 522/156 |
| 2003/0077455 A1 | * | 4/2003 | Amin-Sanayei et al. ..... 428/422 |
| 2004/0197545 A1 | | 10/2004 | Gehlsen et al. |
| 2005/0065229 A1 | | 3/2005 | Bonnet et al. |

OTHER PUBLICATIONS

Rye. Radation Harding of Polytetraethyolene Against Chemical Etching. Journal of Polymer Science: Part B: Polymer Physics, vol. 26, 2133-2144 (1988). {online, May 22, 2008}. Retrived from internet from <URL: http://www3.interscience.wiley.com/cgi-bin/fulltext/104050527/PDFSTART>.*
Lappan et al. The influence of the irradiation temperature on the ratio of chain scission to branching reactions in electron beam irradiated poly(tetrafluoroethylene)(PTFE). Macromolecular Materials and Engineering 292 (2007) 641-645. [online] Retrieved from the internet from <URL: http://www3.interscience.wiley.com/journal/114240125/abstract>.*
Dietmar Auhl, Jens Strange, and Helmut Munstedt, and Beate Krause, Kieter Voigt, Albena Lederer, Uwe Lappan, and Klaus Lunkwitz, "Long-Chain Branched Polypropylenes by Electron Beam Irradiation and Their Rheological Properties", Macromolecules (2004), 37, pp. 9465-9472.
Jianming Gao, Yujie Lue, Genshuan Wei, Xiaohong Zhang, Yiqun Liu, and Jinliang Qiao, "Effect of Radiation on the Crosslinking and Branching of Polypropylene", (2002), Journal of Applied Polymer Science, vol. 85, pp. 1758-1764.
G.J. Nam, J.H. Yoo, J.W. Lee, "Effect of Long-Chain Branches of Polypropylene on Rheological Properties and Foam-Extrusion Performances", Journal of Applied Polymer Science, vol. 96, pp. 1793-1800 (2005).

* cited by examiner

*Primary Examiner*—Sanza L McClendon
(74) *Attorney, Agent, or Firm*—Thomas F. Roland (57) ABSTRACT

Ionized irradiation can be used to improve the properties of fluoropolymers. In particular, elasticity, strain hardening, and melt strength of a fluoropolymer can be increased by LIP to an order of magnitude by exposure to controlled amounts of radiation; while polymer foams may be thermoformed and crosslinked by irradiation to provide a solvent resistance polymer foams having wide range of densities with good mechanical integrity at elevated temperature.

16 Claims, 7 Drawing Sheets

LOW LEVEL RADIATION TREATMENT FOR IMPROVING POLYMER PROPERTIES

FIELD OF THE INVENTION

Low levels of ionized irradiation are used to improve the properties of fluoropolymers and other polymers. In particular, elasticity, strain hardening, shear thinning and melt strength of a fluoropolymer can be increased by up to an order of magnitude by exposure to controlled amounts of radiation; while thermoplastic polymer foams may be selectively compressed and crosslinked by irradiation to provide resilient foams at different densities

BACKGROUND OF THE INVENTION

Polyvinylidene fluoride (PVDF) based polymers are melt-processable fluoropolymer resins that are used to form polymer structures by many processes, such as extrusion, injection molding, fiber spinning, extrusion blow molding and blown film. They are also used as polymer processing aids because of their low surface energies and phase behaviors.

PVDF resin exhibits a poor elasticity in the melt especially for low molecular weight due to its linear chain architecture and relatively narrow molecular weight distribution (polydispersity ~2 to 3). Typically, increasing the molecular weight and introducing co-monomers with different chemical composition overcome this problem. However, these approaches either make the polymer more difficult to process or change the bulk properties of the resin due to the presence of the co-monomer. An alternative to enhance the elasticity and the melt strength of this polymer without changing its chemical composition is by exposure to controlled amounts of radiation.

Open celled foams as described in US 2003/0077455, provide low-density cellular thermoplastic materials that are useful in applications such as cushioning in autos and planes, filtration media, and for shock absorption. Foams made according to the said patent are generally thermoplastic fluoropolymers with low crystallinity, as a result, they exhibit poor solvent resistance and poor compression set, and deformed easily at elevated temperature.

High levels of radiation have been used to graft and crosslink several different polymers, including fluoropolymers. There is no mention of the use of low-level radiation to improve polymer properties, especially on low crystalline polymers.

There is a need for higher melt strength fluoropolymers in many applications. There is also a need for a method of producing solvent resistance fluoropolymer foams having wide range of densities with good mechanical integrity at elevated temperature.

It has now been found that the use of low levels of ionized irradiation in a controlled manner can be used to increase the melt strength and elasticity of a fluoropolymer without changing the chemical composition, and also to produce a dense, flexible material by the thermoforming and crosslinking of foams.

SUMMARY OF THE INVENTION

In a first embodiment, the invention is to a process for improving the melt strength of a fluoropolymer comprising the step of exposing the fluoropolymer to a low level of ionizing radiation to allow for chain branching with little or no crosslinking.

In a second embodiment, the invention relates to a process for forming a solvent resistant and resilient, fluoropolymer or polyethylene-based polymer foam or foam-based article having a wide range of densities with good mechanical integrity at elevated temperature comprising the steps of:
a) thermoforming a fluoropolymer or polyethylene-based polymer foam to a desired form and density;
b) exposing the thermoformed foam to ionizing radiation at a level of less than 10 M-rad to create at least partial crosslinking in the polymer.

DETAILED DESCRIPTION OF THE INVENTION

The term "fluoropolymer", as used herein, refers to polymers and copolymers (including polymers having two or more different monomers, including for example terpolymers) containing at least 50 mole percent of fluoromonomer units. The term "(co)polymers" is used herein to denote both polymers and copolymers. Suitable exemplary fluoromonomers for use according to the invention include, but are not limited to, vinylidene fluoride, vinyl fluoride, trifluoroethylene, chlorotrifluoroethylene (CTFE), tetrafluoroethylene (TFE), and hexafluoropropylene (HFP) and their respected copolymers. A copolymer may contain other fluoromonomrs, or up to 20 percent of other non-fluorinated ethylenically unsaturated monomers copolymerizable therewith. The preferred fluoromonomer is vinylidene fluoride.

The term "polyethylene based foam", as used herein, refers to polymers and copolymers (including polymers having two or more different monomers, including for example terpolymers) containing at least 50 mole percent of ethylene monomer units.

In a first aspect of the invention, a fluoropolymer with a high level of crystallinity is exposed to controlled low levels of ionizing irradiation to alter the polymer chain architecture. The chain scission and recombination in the fluoropolymer chains can be controlled through the use of low irradiation dosages below the percolation limit of crosslinking. The result is a branched polymer formed from the linear fluoropolymer, with little or no crosslinking. The low level of crosslinking means that the solubility of the resin is greater than 90 percent in the appropriate solvent.

Preferred fluoropolymers are vinylidene fluoride homopolymers, and copolymers of vinylidene fluoride and hexafluoropropylene, with the level of HFP in the polymer being from about 2-25 wt. percent of the copolymer having at least 10% crystallinity A strong radiation source is required for the process of the inventions since the C-C bonds in the fluoropolymer are difficult to break. Irradiation sources useful in the invention include, but are not limited to electron-beam and gamma irradiation. The levels of radiation useful in the invention are in the range of 0.1 to 20 M-rad preferably between 0.2 to 10 M-rad, and more preferably between 0.2 and 7.5 M-rad. The level of radiation required in the invention is related to the level of crystallinity of the polymer, with a lower level of radiation required with polymers having lower levels of crystallinity.

Irradiation of the fluoropolymer may be performed on polymer pellets, polymer powder, and even on the polymer in the melt state.

As a result of exposure to a controlled level of irradiation, the polymer architecture develops branching, which has a surprisingly pronounced effect on the rheological properties. The polymer will exhibit a higher shear thinning behavior, a higher melt elasticity and a higher melt strength. Unexpectedly the melt strength of poly(vinylidene fluoride) and poly (vinylidene fluoride-hexafluoropropylene) is increased by up to one order of magnitude when subjected to electron beam radiation, without a noticeable increase in the viscosity under process conditions. The irradiated fluoropolymer has a higher viscosity at low shear rates, but with shear thinning results in a lower viscosity at the higher shear rate during processing. The change in melt strength and elasticity is sensitive to the level of radiation, the molecular weight, and chemical composition of the resin.

Figure 4:
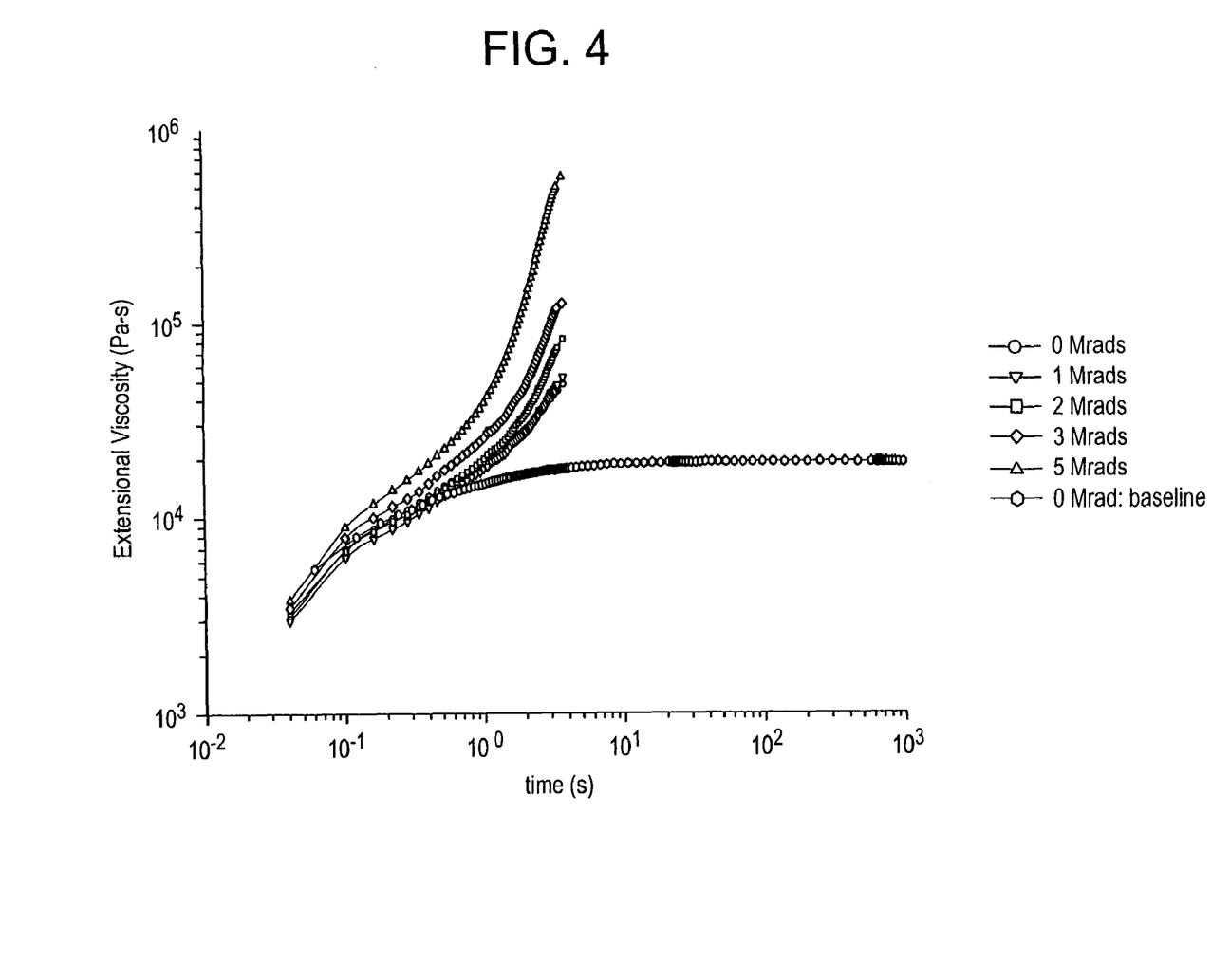
FIG. 4: is a plot of extensional viscosity of VF2-based homopolymer at 180° C. and compared to E-beam irradiated VF2-based homopolymer
Figure 5:
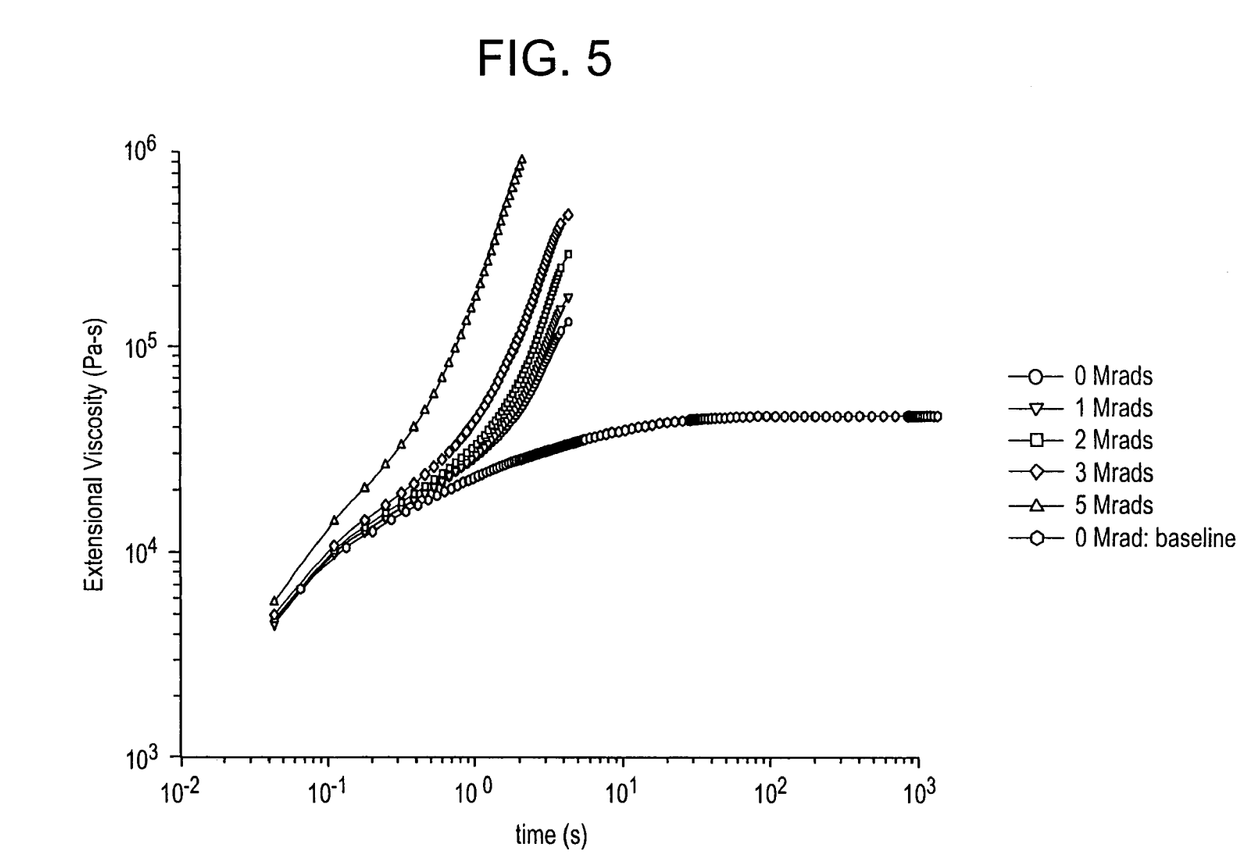
FIG. 5: Is a plot of extensional viscosity of (VF2-HFP)-based copolymer at 180° C. and compared to E-beam irradiated (VF2-HFP)-based copolymer

The irradiated fluoropolymer shows strain hardening at different extension rates, and increases with the level of irradiation, as shown in FIGS. 4 and 5.

These enhanced properties of the irradiated fluoropolymer result in better process ability of these resins in extrusion, blown film and extrusion blow molding and extrusion of rigid foams without a change in the inherent physical properties of the resins (such as the flex modulus, melting point or chemical resistance.).

In melt processing the material exhibiting higher shear thinning will be favorable due to a reduced head pressure for the same throughput. This allows to an increased production capacity without a change in the equipment. Resins exhibiting high elasticity and melt strength will possess enough integrity for profile extrusion and significantly reduce sag post-extrusion. High melt strength is also accompanied by a better resistance and stretch ability in the melt. This allows a better foaming at high extension rates without causing bubble bursting. The higher melt strength aids in the formation of extrusion blown films, where high blow up ratios are present. High melt strength is also beneficial in fiber spinning and drawn film formation. In profile extrusion, such as used to form pipes, tubing, wire, cable and sheets, the high melt strength material will exhibit an onset of shear thinning lower than that observed in analogous linear polymers. This leads to lower head pressure, and torque, and reduces energy costs without sacrificing the bulk properties of the resin. In injection molding, the resin of the invention will exhibit much lower viscosity at high shear rates than an equivalent linear PVDF polymer, resulting in an improved surface finish and a higher throughput.

The irradiated fluoropolymer can be blended with non-irradiated fluoropolymers, to control the rheological properties of the final composition. For example, irradiated pellets may be melt compounded or dry blended with non-irradiated pellets.

In a second embodiment of the invention, a polymer foam is thermoformed and irradiated to form a solvent resistance fluoropolymer foam or foam-based article having a wide range of densities with good mechanical integrity and resiliency at elevated temperature. The polymer foam can be a thermoplastic foam of any polymer composition. Preferred foams are those of semi-crystalline polymers with low Tgs such as polyethylene-based polymers and copolymers, polychloroprene polymers and copolymers, and fluoropolymers with low crystallinity content such as copolymers of vinylidene fluoride (VDF) and hexafluoropropylene (HFP), chlorotrifluoroethylene (CTFE) and HFP copolymers, trifluoroethylene (TFE) and perfluoromethyl vinyl ether (PMVE) copolymers, VDF-TFE-HFP terpolymers, and mixtures thereof with compatible glassy polymers. A preferred class of polymers in the foam is that having low internal crystallinity.

The thermoplastic polymer foam may be formed by any means known in the art, such as by the use of chemical or mechanical blowing agents, gas injection, and freezing techniques.

In one embodiment, the polymer foam is formed by the method described in US 2003/0077455, incorporated herein by reference. In this process, a latex of a VDF-based polymer is formulated and placed into a mold, and then the mold and contents are chilled by any convenient means to a temperature below the freezing point of the aqueous phase. The mold is removed from freezing, and allowed to drain at room temperature, resulting in an open celled foam.

In the process of the invention the thermoplastic polymer foam is thermoformed into a final shape and density depending on the application requirements. The density of the foam can be controlled to any level desired to produce a resilient cushioning for a variety of applications. For example, the for the fluoropolymer foam made according to US 2003/0077455, the density of a molded article can vary from 0.2 to 1.8 g/cm$^3$.

The thermoformed polymer foam is then exposed to low levels of irradiation, in order to crosslink, or partially crosslink the polymer foam. Irradiation sources useful in the invention include, but are not limited to electron-beam and gamma irradiation. The levels of radiation useful in the invention are in the range of 0.1 to 20 M-rad preferably between 0.2 to 10 M-rad, and more preferably between 0.5 and 7.5 M-rad. A thermoformed article produced from the formed, irradiated foam maintains its shape. The crosslinking of the foam significantly increases the solvent resistance of the formed foam material. The irradiated foam also exhibits good mechanical integrity at elevated temperature. The material may be cut and shaped as required for final use. The thermoplastic foam could also be part of an in-mold lamination process in which the foam is placed in the mold with one or more other layers, thermoformed and irradiated.

In one application, the final cross-linked thermoformed fluoropolymer or polyethylene-based crosslinked material, is useful for the production of gasketing material, as it is solvent and chemical resistant, can have a wide range of densities, and exhibits good mechanical integrity at elevated temperatures.

Through the use of this invention, a clear fluoroelastomer can be made that is free from impurities, since no added fillers, chemical reagents, or cross-linking promoters are used. Fluoroelastomers made by other cross-linking techniques contain fillers and chemicals, which can add contaminant into a sensitive sealing application. The combination of chemical resistance, lack of extractables, good mechanical properties and compression set at elevated temperatures make the material made by the process of the invention the best suited for applications where contamination is of major concern.

The following examples further illustrate the best mode contemplated by the inventor for the practice of their invention and are intended to be illustrative and not in limitation thereof.

EXAMPLES

In Examples 1-10, PVDF homopolymers and $VF_2$-HFP copolymers having a melt viscosity of 2 to 20 kpoise as measured by capillary rheometry at 230° C. and 100 $sec^{-1}$ are exposed to controlled amounts of E-beam or γ-radiation such that chain scission and recombination occurs within the percolation limit of crosslinking.

Example 1

Figure 1:
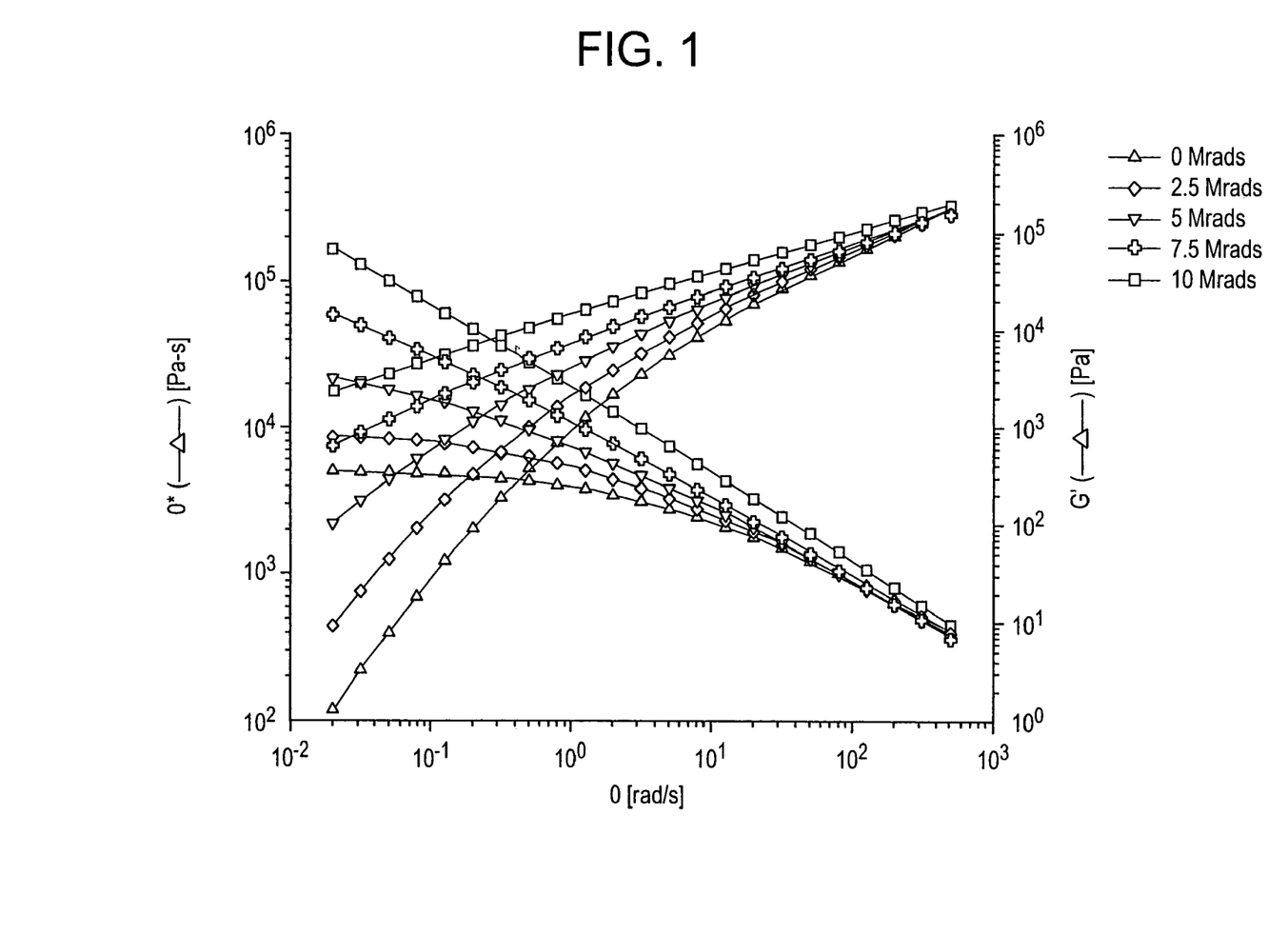
FIG. 1: Is a plot of the complex viscosity and storage modulus as a function of frequency of oscillation measured at 180° for VF2-based homopolymer and compared to E-beam irradiated VF2-based homopolymer.

A PVDF resin with a viscosity of 6 kpoise at 230° C. was exposed to different levels of e-beam radiation as shown in Table 1. The irradiated PVDF shows a significant increase in viscosity and storage modulus at low frequency, as shown in FIG. 1. The melt strength was increased by a factor of about 10. The viscosity was measured by a rotational rheometer under standard conditions.

TABLE 1

Rheological Results of VDF-based homopolymer

| Radiation (Mrads) | Zero-shear viscosity (Pa · sec) at 180° C. | Storage modulus G' (Pa) at 180° C. and 0.02 rad/s | Power-law index "n" Indicating shear thinning | Melt strength (mN) at 180° C. |
|---|---|---|---|---|
| 0.0 | 5,254 | 1.3 | 0.48 | 33 |
| 2.5 | 9,454 | 9.2 | 0.48 | 85 |
| 5.0 | 38,540 | 102.2 | 0.42 | 370 |
| 7.5 | $6.1 \times 10^6$ | 640.0 | 0.34 | >500 |

The shear thinning behavior indicated by the power law index "n" is either decreased or unchanged depending on the level of radiation. The elastic modulus is increased by 600 times while the melt strength is increased by more than 15 times.

Example 2

A $VF_2$-HFP copolymer containing less than 40% HFP, with a melt viscosity of 2.5 kpoise was exposed to different levels of E-beam radiation as shown in Table 2. The copolymer shows an increase in the melt elasticity and strength. A significant change in the shear thinning behavior is also observed.

TABLE 2

Rheological Results - VDF-based copolymer with <40% Hexafluoropropylene

| Radiation (Mrads) | Viscosity (Pa · sec) at 230° C., 0.02 rad/sec | Storage modulus G' (Pa) at 230° C. and 0.02 rad/s | Power-law index "n" Indicating shear thinning | Melt strength (mN) at 230° C. |
|---|---|---|---|---|
| 0.0 | 19,285 | 184 | 0.22 | 60 |
| 1 | 22,882 | 233 | 0.15 | 84 |
| 2.5 | 33,083 | 365 | 0.16 | 133 |
| 5 | 56,444 | 517 | 0.16 | >200 |

Example 3

Figure 2:
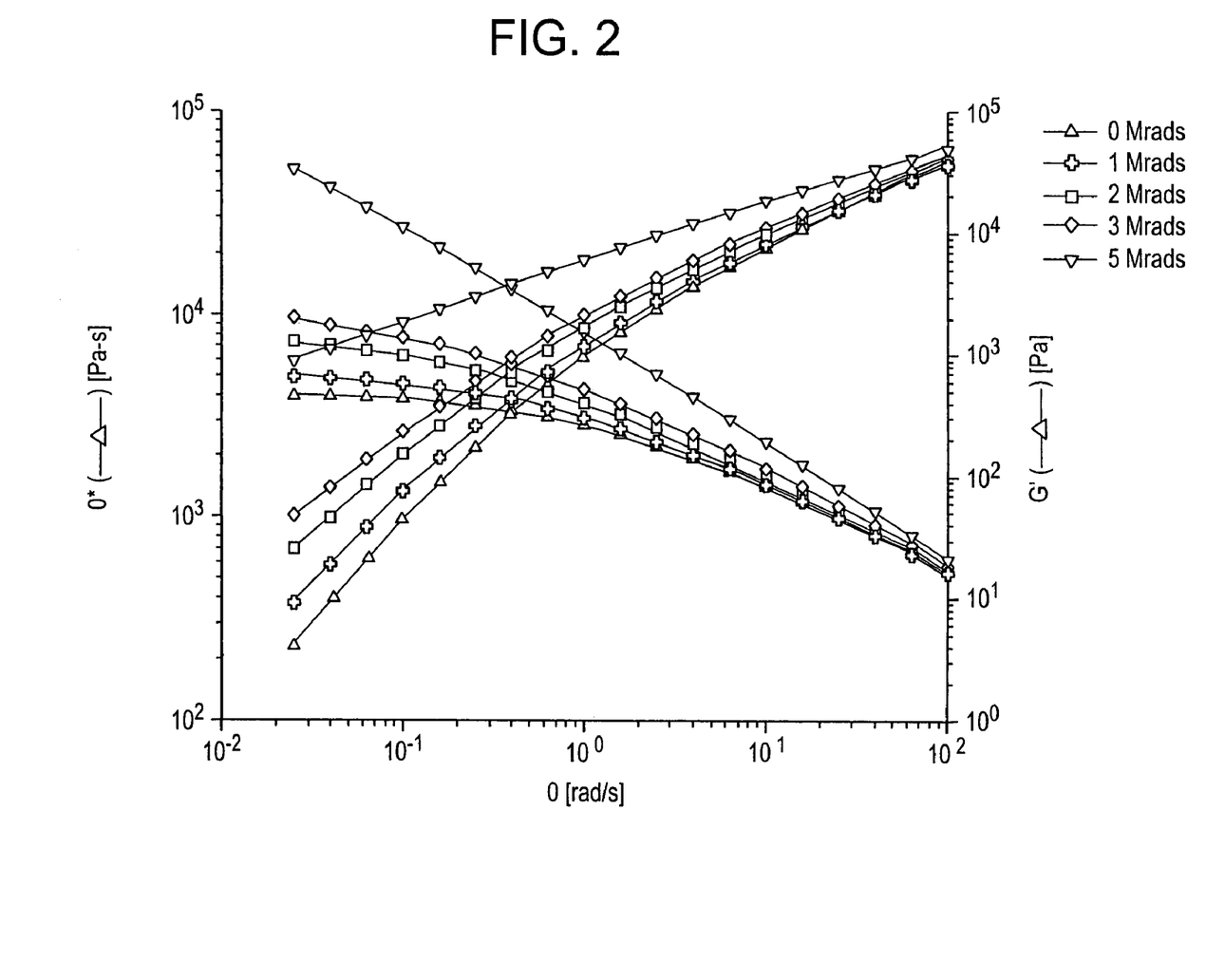
FIG. 2: Is a plot of the complex viscosity and storage modulus as a function of frequency of oscillation measured at 230° for (VF2-HFP)-based copolymer and compared to E-beam irradiated (VF2-HFP)-based copolymer.

A $VF_2$-HFP based copolymer containing less than 20% HFP and with a melt viscosity of 8 kpoise at 230° C. was exposed to different levels of E-beam radiation, as shown in Table 3. The irradiated copolymer shows a significant change in viscosity and storage modulus at low frequency and a moderate change in the shear thinning behavior, as shown in FIG. 2. The melt strength is improved by a factor of 4.

TABLE 3

Rheological Results - VDF-based copolymer with <15% Hexafluoropropylene

| Radiation (Mrads) | Viscosity (Pa · sec) at 230° C., 0.025 rad/sec | Storage modulus G' (Pa) at 230° C. and 0.025 rad/s | Power-law index "n" Indicating shear thinning |
|---|---|---|---|
| 0.0 | 3,976 | 4 | 0.56 |
| 1 | 4,943 | 9.2 | 0.52 |
| 2 | 7,332 | 25.6 | 0.48 |
| 3 | 9,638 | 47.4 | 0.46 |
| 5 | 52,271 | 887 | 0.22 |

Example 4

Figure 3:
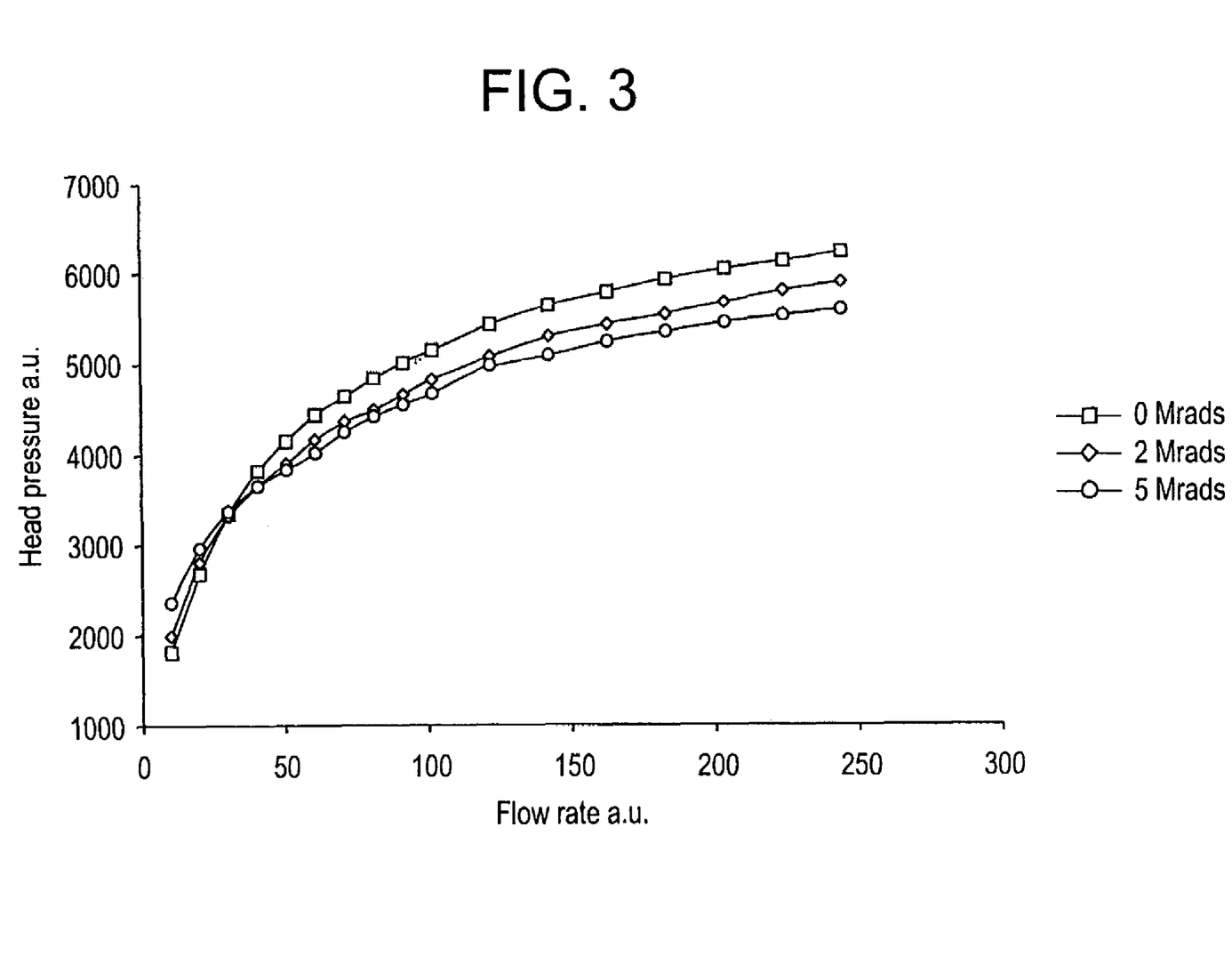
FIG. 3: Is a plot of head pressure versus flow rate of VF2-based homopolymer at 180° C. and compared to E-beam irradiated VF2-based homopolymer.

VDF-based homopolymer pellets were exposed to E-beam radiation up to 10 Mrads. The pellets were extruded in a DSM twin screw extruder wherein the head pressure was measured as function of throughput (flow rate). The said polymer, when exposed to radiation, shows a lower head pressure at the same throughput as shown in FIG. 3.

Example 5

VDF-based homopolymer pellets were exposed to E-beam radiation up to 10 Mrads, as shown in Table 4. The pellets were compression molded at 210° C. and 10,000 psi for 5 min into ¼" plaques and cut out into bars. A pycnometer was used with helium to measure the density. The density of the resin remains unchanged upon exposure to E-beam radiation.

TABLE 4

Density measurements of VDF-based homopolymer

| Level of Radiation (Mrads) | Density at 25° C. (g/cm³) |
|---|---|
| 0.0 | 1.7740 |
| 2.5 | 1.7742 |

TABLE 4-continued

Density measurements of VDF-based homopolymer

| Level of Radiation (Mrads) | Density at 25° C. (g/cm³) |
|---|---|
| 5.0 | 1.7730 |
| 7.5 | 1.7730 |
| 10 | 1.7725 |

Example 6

VDF-based homopolymer pellets were exposed to E-beam radiation up to 10 Mrads. The pellets were then compression molded at 200° C. and 5,000 psi for 5 min into 0.1 mm thick film. The extensional viscosity was measured using an ARES strain rheometer equipped with extensional viscosity fixture at 180° C. and extension rate of 1 sec$^{-1}$ as Shown in FIG. 4. The irradiated samples show an significant increase in the strain hardening with increasing the level of radiation.

Example 7

VDF-based copolymer pellets were exposed to E-beam radiation up to 10 Mrads. The pellets were then compression molded at 200° C. and 5,000 psi for 5 min into 0.1 mm thick film. The extensional viscosity was measured using an ARES strain rheometer equipped with extensional viscosity fixture at 180° C. and extension rate of 1 sec$^{-1}$ as shown in FIG. 5. The irradiated samples show a significant increase in the strain hardening with increasing the level of radiation.

Example 8

Figure 6:
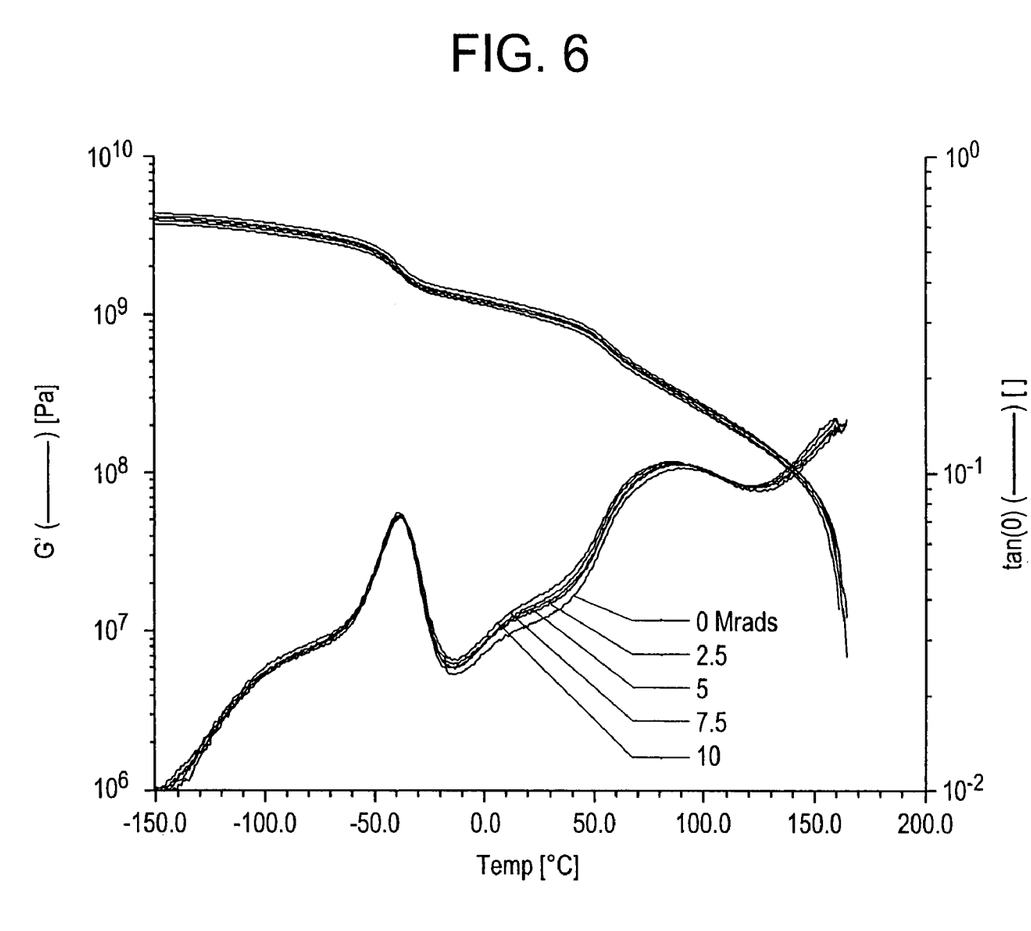
FIG. 6: Is a plot the dynamic mechanical properties, measured by DMA, of a non-irradiated PVDF homopolymer and an irradiated PVDF homopolymer.

VDF-based copolymer pellets were exposed to E-beam radiation up to 10 Mrads. The pellets are compression molded at 210° C. and 10,000 psi for 5 min into ¼" plaques and cut out into bars. The dynamic mechanical properties are measured by DMA in the shear mode at 1 Hz and in the temperature range of −150 to 170° C., and the plots are shown in FIG. 6. The storage and loss modulii are measured at low strains (0.03%). The mechanical properties remain unchanged over the entire temperature range.

Example 9

Figure 7:
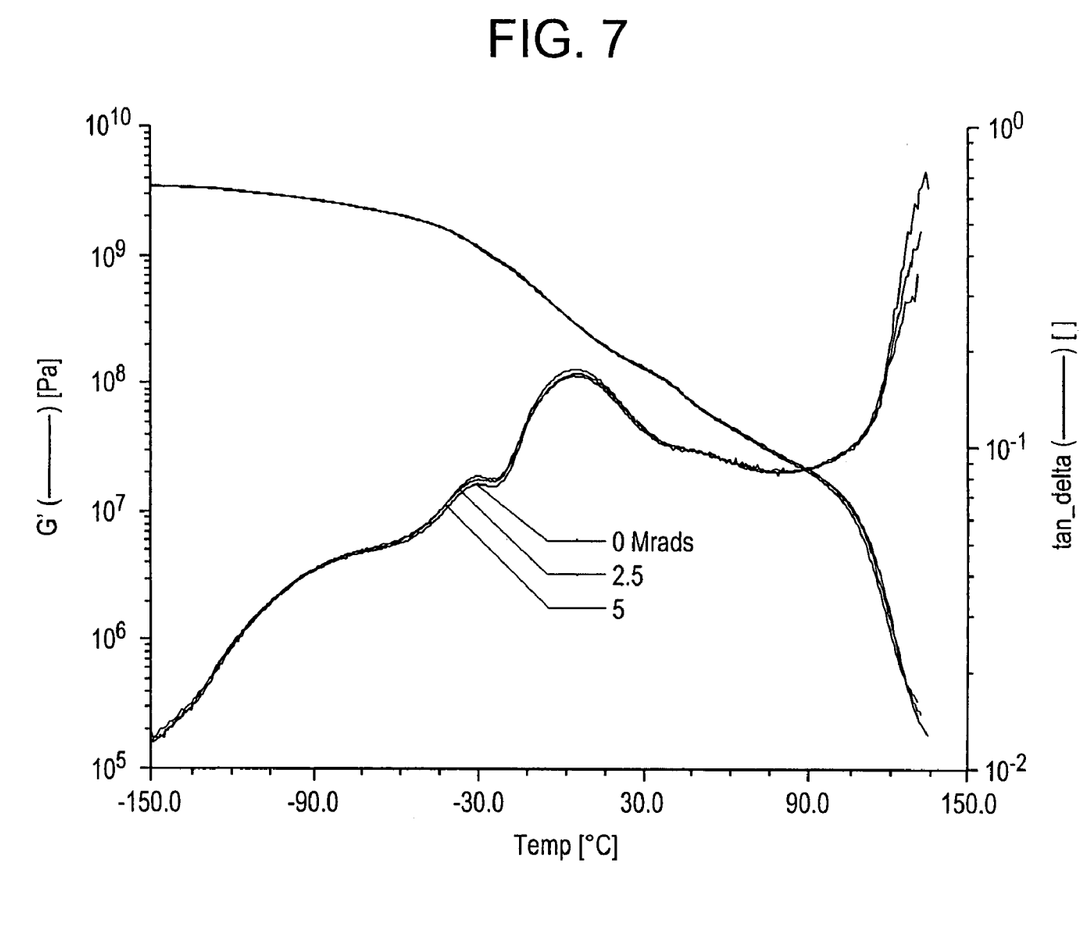
FIG. 7: Is a plot of the dynamic mechanical properties, measured by DMA, of a non-irradiated (VF2-HFP)-based copolymer and an irradiated (VF2-HFP)-based copolymer.

VDF-based copolymer pellets were exposed to E-beam radiation up to 10 Mrads. The pellets are compression molded at 210° C. and 10,000 psi for 5 min into ¼" plaques and cut out into bars. The dynamic mechanical properties are measured by DMA in the shear mode at 1 Hz and in the temperature range of −150 to 150° C., and the plots are shown in FIG. 7. The storage and loss modulii are measured at low strains (0.03%). The mechanical properties remain unchanged over the entire temperature range.

Example 10

VDF-based homopolymer pellets were exposed to E-beam radiation up to 10 Mrads. The pellets were extruded using the DSM micro-extruder equipped with a film device at 240° C. and 15 rpm. The pellets were extruded in a form of a film and the thickness of the film was measured as a function of take-up speed. The E-beam irradiated VDF-based homopolymer possess a smaller thickness at the same take up speed when compared to non-irradiated VDF homopolymer as shown in Table 4.

TABLE 4

Film thickness as a function of take-up speed during extrusion of VDF-based homopolymer

| Speed (mm/min) | Thickness (0 Mrad) microns | Speed (mm/min) | Thickness (3 Mrads) microns |
|---|---|---|---|
| 250 | 40 | 250 | 25 |
| 300 | 26 | 300 | 10-12 |
| 400 | 16-18 | 400 | 8 |
| 500 | 14 | 500 | 6 |
| 600 | break | 600 | 4 |

Example 11

Preparation of Open Celled Polymer Foams

A general procedure for the production of foams from the latexes of VDF-based polymers is as follows:

A latex is placed in an appropriate closed mold of the described shape. The mold and its latex contents are cooled below the freezing point of the aqueous phase of the latex. The frozen latex is then removed from the mold, its temperature is allowed to rise above the melting point of the aqueous phase, and the thawed aqueous phase is allowed to drain from the foam, which is then dried.

The following formulations were prepared according to teaching of US 2003/0077455:

Sample 11.1 Pure VDF/HFP copolymer having low crystallinity latex (37% solids by weight, 33 weight percent HFP)

Sample 11.2 Using low crystalline VDF/HFP of 33 weight percent HFP, (600 g) was diluted with water containing 10% by weight acetone to 29.1% solids by weight are combined by stirring with varying amounts (0 to 40 g) of degreased glass fiber. The mixtures are then formed into foam.

Sample 11.3 Using low crystalline VDF/HFP of 33 weight percent HFP with solids of 34% (600 g) water containing 10% by weight acetone to 20% solids by weight.

These formulations were placed in closed flat molds and chilled until frozen. The molds were opened, and the frozen foam removed and placed on a drying rack. After removal of the water, a self supporting foams were recovered.

The foams are subjected to the following physical tests.

Apparent Density:

The volume is measured and the sample weighed. Density is the standard weight/volume measurements. The measurement gives an apparent density because any skin is not removed during measurement. The standard procedure is ASTM D1621-94 for density and compression testing.

Compression testing is run according to the above general procedure using an INSTRON with head speed at 0.5 in/min over 3 runs using 1.5 inch tall cylinders stress and strain at given times are measured.

Compression Set is determined according to ASTM D3573-93 but for 72 and 22 hours at 125° C.

The apparent densities determined for foam from formulations 6.1, 6.2, and 6.3, are:

11.1=0.61 g/ml
11.2=0.42 g/ml
11.3=0.33 g/ml

The properties exhibited by the foam material made herein are in contrast to the corresponding solid polymer, which has a density of about 1.8 g/ml.

11.4: Foams made in the above process were subjected to thermoforming and converted to flat sheets. The sheet densities could be controlled between the foam densities reported above up to 1.8 g/ml which correspond to bulk density of solid polymer.

Example 12

Irradiation of Open Celled Polymer Foams and their Corresponding Thermoformed Objects 12.1: The open celled foam of example 11.3 was subjected to 10 M-rad E-beam irradiation at room temperature. The general appearance of the irradiated foam was unchanged and the density remained at 0.33 g/ml but the solvent resistance of the foam was significantly improved. It becomes virtually insoluble in any solvent where the original foam was soluble in acetone, MEK, hot methanol, acetate based solvents.

12.2 Sheets made from the foam of example 11.3 with density of 1.8 g/ml were subjected to 0 to 10 M-rad of gamma irradiation. The results from compression for 22 and 72 hours at 125° C. are tabulated in Table 7-2.

TABLE 12-2

| Irradiation level (M-rad) | Compression set for 22 hrs at 125° C. | Compression set for 72 hrs at 125° C. |
|---|---|---|
| 0.5 | 62.6 | 70.4 |
| 1 | 39.3 | 53.6 |
| 2 | 25.0 | 33.5 |
| 5 | 23.2 | 23.2 |

In the Table 12-2 compression set values at 125° C. indicate that the sheets became resistance to permanent deformation or in other words behaving more like rubber than thermoplastics without a need for any cross-linking promoter.

Swell ratio was measure by placing about 1 gr of irradiated material into a vial then 20 gr of acetone was added to the vial and was caped. After 48 hr, the weight of swollen sample was measured. Then sample was placed in the oven at 125° C. for at least 24 hr before it was weighted again. The following swell ratios in Table 7.3 were obtained for sample in example B.2

TABLE 12.3

| Irradiation level (M-rad) | Swell ratio (g of solvent in g of polymer) | % Extractable in the acetone |
|---|---|---|
| 0 | | 99.44 |
| 0.5 | 10.99 | 7.32 |
| 1 | 8.73 | 10.91 |
| 2 | 7.10 | 12.01 |
| 5 | 3.80 | 15.17 |

What is claimed is:

1. A process for improving the melt strength of a fluoropolymer comprising the steps of:
   a) exposing said fluoropolymer to a low level of ionizing radiation below the percolation limit thereby producing chain branching with little or no crosslinking, wherein the level of ionizing radiation is from 0.1 to 7.5 M-rad; and
   b) melt processing said fluoropolymer after exposure to said low level of ionizing radiation, wherein said fluoropolymer is a polyvinylidene fluoride homopolymer, or a polyviylidene fluoride copolymer or terpolymer having at least 50 weight percent of vinylidene fluoride monomer units, and wherein said melt strength is improved, and wherein the fluoropolymer being exposed to the ionizing radiation is in the form of a pellet, or a powder.

2. A The process of claim 1, wherein said fluoropolymer is a copolymer of vinylidene fluoride and hexafluoropropylene, wherein the level of hexafluoropropylene in the copolymer is from 2 to 25 percent by weight.

3. The process of claim 1, wherein the ionizing radiation source is electron beam, or gamma radiation.

4. The process of claim 1, wherein said melt processing comprises, extrusion blow molding whereby said polymer is subjected to gravity forces in the melt and stretched to form a hollow object such as bottle or containers.

5. The process of claim 1, wherein said melt processing comprises formation of a sheet or cast film.

6. The process of claim 5 wherein said sheet is subsequently thermoformed to produce molded parts with complex cavities.

7. The process of claim 1 wherein said melt processing comprises forming a blown film.

8. The process of claim 1 further comprising the step of adding said fluoropolymer exposed to said ionizing radiation as a melt processing aid into the processing of non-fluoropolymers.

9. A process for forming a solvent resistant and resilient material from a thermoplastic polymer foam comprising the step of:
   exposing a thermoplastic fluoropolymer foam to ionizing radiation below the percolation limit at a level of from 0.1 to 7.5 M-rad to create at least partial crosslinking in the polymer foam;
   wherein said fluoropolymer is a polyvinylidene fluoride homopolymer, or a polyviylidene fluoride copolymer or terpolymer having at least 50 weight percent of vinylidene fluoride monomer units.

10. The process of claim 9, further comprising the step of thermoforming the polymer foam to a desired form and density, prior to the step of exposing the foam to ionizing radiation, wherein the density of said thermoformed film is from 0.05 to 1.8 g/cm³.

11. The process of claim 9, wherein said polymer foam that is thermoformed is formed by a process comprising:
   a) placing a latex or aqueous suspension of a polymer having coalescability below the freezing point of the aqueous phase of said latex or suspension in a mold;
   b) chilling said mold and the latex or suspension contained therein below the freezing point of the aqueous phase of said latex or suspension;
   c) optionally removing the frozen material from the mold; and
   d) removing the water from the frozen material to permit recovery of said foam.

12. The process of claim 9, wherein said polymer foam is a fluoropolymer foam.

13. The process of claim 12, wherein said fluoropolymer foam comprises a polyvinylidene polymer or copolymer.

14. The process of claim 9, wherein said thermoformed foam is exposed to from 0.2 to 10 M-rad of ionizing radiation.

15. A clear, crosslinked fluoropolymer containing essentially no filler, chemical reagents, or cross-linking promoters.

16. The clear, crosslinked fluoropolymer of claim 15 in the form of an article.

* * * * *